United States Patent Office 3,825,540
Patented July 23, 1974

3,825,540
3-(MORPHOLINOETHOXY)PYRIDAZINES
Henri Laborit, 78 Rue de la Convention,
Paris 15, France
No Drawing. Filed Oct. 29, 1969, Ser. No. 872,363
Claims priority, application Great Britain, Nov. 1, 1968,
51,873/68
Int. Cl. C07d 87/40
U.S. Cl. 260—247.5 R       2 Claims

ABSTRACT OF THE DISCLOSURE

There is described new chemical compounds of the general formula:

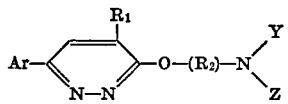

where:

$R_1$ is a lower alkyl substituent particularly methyl;
$R_2$ is

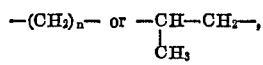

$n$ is 2, 3 or 4;
Ar is halogen or a lower alkoxy substituent particularly methoxy or a cycle particularly phenyl, naphthyl, thienyl; Y and Z represent lower alkyl group functions, these groups being able to be cyclized so as to form with the atom of nitrogen, a heterocyclic radical such as morpholinyl-, methylpiperazinyl, and non-toxic acid salts thereof, the said compounds having psychotropic activity in the fields of analgesia and anti-neurotic and anti-anxiety treatment of mammals including man.

---

The present invention relates to a new family of chemical compounds of which the members are distinguished by their psychotropic action, and particularly analgesic, anti-inflammatory, potentiating of barbiturates and anti-neurotic.

This family has the general formula:

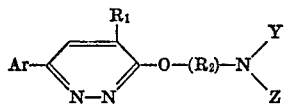

where:
$R_1$=lower alkyl with 1–3 C, particularly methyl;
$R_2$ is

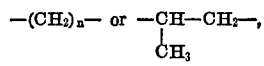

$n$ is 2, 3 or 4;
Ar=H or lower alkoxy with 1–3 C, particularly methoxy or a cycle particularly phenyl, naphthyl, thienyl;
Y and Z represent the lower alkyl groups with 1–3 C, these groups being able to be cyclized so as to form with the atom of nitrogen a heterocyclic radical such as morpholinyl-, methylpiperazinyl-.

Set forth below is the table showing the synthesized molecules.

TABLE I.—LIST OF THE SYNTHESIZED COMPOUNDS*

$$\text{Ar}-\underset{N-N}{\overset{CH_3}{\bigcirc}}-O-(CH_2)_n-N\diagup^Y_Z$$

| Code Ag | Ar | $R_1$ | $n$ | Y-Z |
|---|---|---|---|---|
| 614 | β-Naphthyl | CH₃ | 2 | —N⌒O |
| 618 | α-Naphthyl | CH₃ | 2 | Same as above |
| 619 | β-Naphthyl | CH₃ | 3 | Do. |

*Correspond to the branched chain.

It seems that, although the invention is not limited by any theory, the psychotropic action of these compounds is connected with the simultaneous presence of the group $R_1$ (alkyl in position 4 on the pyridazine nucleus) and, in position 3, of the nitrogenated group of which the nitrogen is separated from the pyridazine nucleus by two or three atoms of carbon.

The invention also relates to a process for the preparation of these compounds by the reaction of a 3-chloropyridazine with an alcoholate.

According to a subsidiary characteristic, the alcoholate considered is prepared by the action of powdered sodium on the corresponding alcohol in a reaction mixture diluted by means of anhydrous tetrahydrofurane.

Set forth in the table below is the physical properties of a certain number of compounds, of which the preparation will be described hereinafter in detail in the examples.

TABLE II.—PHYSICAL CONSTANTS OF THE SYNTHESISED COMPOUNDS

| Code | Aspect | °F. | | Solubility |
|---|---|---|---|---|
| 614 | White powder | 192 | (HCl) | Cold water +. |
| 618 | Pink powder | 193 | (2 HCl) | Cold water +. |
| 619 | Beige powder | 171 | (2 HCl) | Hot water +. Cold water −. |

The chloropyridazines not described in the literature have been obtained by the action of phosphorous oxychloride on the corresponding pyridazones, the latter resulting themselves from cyclisation reaction between -acyllactic acids and the hydrazine.

By way of example, the synthesis of 3-chloro 4-methyl 6-(2'-naphthyl) pyridazine will be described:

Principle:

(1)
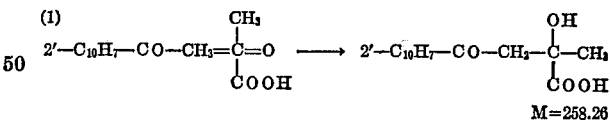

(2)
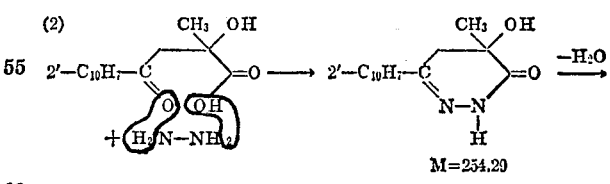

(3)
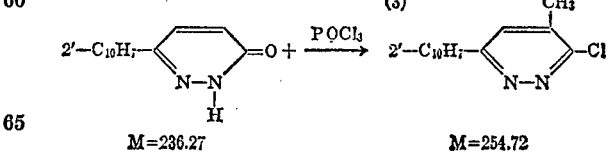

Operational method (7) Preparation of α-hydroxy α-methyl γ-keto α-naphtylbutyric acid.—Introduce 70 ml. (1 mole) of pyruvic acid into a 2 litre conical flask. Neutralise exactly with a 20% solution of KOH (approx. 350 ml.) whilst cooling and stirring. Then add 170 g. (1 mole) of 2-methyl naphtylketone, then a solution of 70 g. of KOH in one litre of methanol. Add again 1 litre of methanol to homogenise the reaction medium.

Leave to rest for two days at ambient temperature (do not place in a cold chamber because the methylnaphtylketone precipitates).

After this time neutralise exactly to pH 7 with $H_2SO_4$ 10 N (approx. 120 ml.). Whilst cooling evaporate the methanol under vacuum. Acidify with $H_2SO_4$ 10 N (approx. 300 ml.). Add water in a sufficient quantity to dissolve $K_2SO_4$ formed and extract with ether by three portions (300—100—100 ml.). Wash the ethereal layer with 100 ml. of water and extract with a solution of 10% potassium bicarbonate (500–750 ml.).[1]

Wash the bicarbonated fraction with a little ether and acidify in an ice bath with $H_2SO_4$ 10 N (approx. 105 ml.).

A white precipitate is obtained which is filtered, washed with water and dried. It is recrystallised in 40% alcohol. The yield obtained after recrystallisation: 46 g., or 18%. F=160°.

(2) Preparation of 4-methyl 6-naphthyl pyridazone.—Introduce 46 g. (0.18 mole) of the preceding acid into a 250 ml. flask. Dissolve it in hot butanol. Then add 9 g. 0.20 mole) of hydrated hydrazine and 100 ml. of butanol. Distil the solution obtained: the azeotropic water-butanol distils over at 92°5, the butanol at 117°. At this stage, stop the distillation and evaporate the excess butanol under vacuum. A light yellow residue is obtained which is the 4-methyl 6-(2'-naphthyl) pyridazinone. F=200°.

To this residue add 130 ml. of crystallisable $CH_3COOH$ and 3.2 ml. concentrated HCl. Bring the oven to 110° for one hour and a half. At the end of this time tip the solution obtained into some crushed ice (approx. 300 g.). The pyridazone precipitates. It is pale yellow. The pyridazone formed is filtered washed with water and recrystallised in isopropanol.

The yield obtained after recrystallisation: 30 g., or 70%. F=228°.

(3) Preparation of 3-chloro 4-methyl 6-naphthyl pyridazine.—Add 46.5 ml. of $POCl_3$ to a 250 ml. flask containing 30 g. (0.127 mole) of the pyridazone described above. Carry the mixture for 1½ hours under reflux stirring from time to time. The solution adopts a dark red colour. Then pour it into crushed ice (approx. 300 g.) and add a solution of 25 g. soda in 125 ml. of water. It forms a pink precipitate which is filtered and well washed with water. The product obtained is recrystallised in methanol. The yield obtained after recrystallisation: 27 g., or 81%. F=167°.

In a similar manner the chloropyridazines necessary for the synthesis of the compounds Agr 600, 601, 602, 606, 607, 608, 613, 618, 622, 654 and 668 have been prepared.

The constants of the new β-acyllactic acids, hydroxypyridazinones, pyridazones and chloropyridazines are shown in the following tables:

---
[1] The ethereal phase is dried on anhydrous $MgSO_4$ and evaporated. Thus the original ketone, which has not reacted, is recuperated.

β-ACYLLACTIC ACIDS

| Formulae | °F. | Recrystallisation solvent | Yield, percent | Calculated C | Calculated H | Found C | Found H |
|---|---|---|---|---|---|---|---|
| (thiophene)-CO-CH₂-C(CH₃)(OH)-COOH | 124 | $C_6H_6$ | 12.5 | 50.45 | 4.70 | 49.82 | 4.65 |
| (naphthyl)-CO-CH₂-C(CH₃)(OH)-COOH | 160 | Alcohol at 40° | 20 | 69.75 | 5.46 | 69.34 | 5.34 |
| (naphthyl)-CO-CH₂-C(CH₃)(OH)-COOH | 122 | Alcohol at 45° | 28.5 | 69.75 | 5.46 | 69.17 | 5.41 |

CHLOROPYRIDAZINES

| Formulae | °F. | Recrystallisation solvent | Yield, percent | Calculated C | Calculated H | Calculated N | Found C | Found H | Found N |
|---|---|---|---|---|---|---|---|---|---|
| $CH_3O$-(phenyl)-(pyridazine)-Cl | 127 | Methanol | 89 | 61.41 | 4.72 | 11.93 | 61.16 | 4.70 | 11.76 |
| Cl-(phenyl)-(pyridazine-I)-Cl | 189 | Tetrahydrofurane | 80 | 55.23 | 3.37 | 11.57 | 55.30 | 3.40 | 11.54 |
| (Cl-phenyl)-(pyridazine)-Cl | 96 | ....do.... | 59 | 55.23 | 3.37 | 11.57 | 55.17 | 3.41 | 11.76 |

TABLE—Continued
| Formulae | °F. | Recrystallisation solvent | Yield, percent | Calculated C | Calculated H | Calculated N | Found C | Found H | Found N |
|---|---|---|---|---|---|---|---|---|---|
| 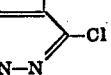 | 132 | Methanol | 75 | 55.23 | 3.37 | 11.57 | 55.07 | 3.50 | 11.65 |
| 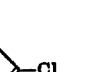 | 135 | ....do.... | 88 | 51.30 | 3.35 | 13.20 | 51.26 | 3.39 | 13.0 |
|  | 167 | ....do.... | 81 | 70.72 | 4.35 | 11.0 | 70.22 | 4.33 | 11.0 |
| 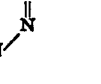 | 114 | ....do.... | 82 | 70.72 | 4.35 | 11.0 | 70.57 | 4.53 | 11.10 |
|  | 142 | ....do.... | 63.5 | 63.00 | 3.39 | 14.69 | 62.19 | 3.79 | 14.43 |
| 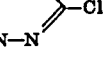 | 64 | ....do.... | 89 | 65.90 | 5.07 | 12.8 | 65.50 | 5.20 | 12.5 |
HYDROXY PYRIDAZINONES
| Formulae | °F. | Recrystallisation Solvent | Yield, percent | Calculated C | Calculated H | Calculated N | Found C | Found H | Found N |
|---|---|---|---|---|---|---|---|---|---|
|  | 147 | Alcohol at 50° | 92 | 64.69 | 5.92 | 13.72 | 64.51 | 5.79 | 13.87 |
|  | 216 | Isopropanol | 95 | 61.52 | 6.02 | 11.96 | 61.40 | 5.95 | 11.87 |
|  | 188 | ....do.... | 90 | 55.35 | 4.64 | 11.73 | 55.65 | 4.88 | 11.95 |
|  | 172 | ....do.... | 83 | 55.35 | 4.64 | 11.73 | 56.57 | 4.60 | 12.13 |
|  | 186 | ....do.... | 72 | 51.40 | 4.79 | 13.32 | 51.67 | 4.65 | 13.07 |

TABLE—Continued

| Formulae | °F. | Recrystallisation Solvent | Yield, percent | Analysis, percent Calculated | | | Analysis, percent Found | | |
|---|---|---|---|---|---|---|---|---|---|
| | | | | C | H | N | C | H | N |
| 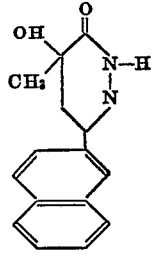 | 200 | ....do.......... | 85 | 70.84 | 5.53 | 11.03 | 70.97 | 5.63 | 11.00 |
| 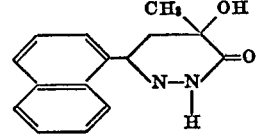 | ...... | Liquid.......... | Gummy | | | | | | |
| 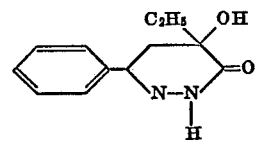 | 162 | Isopropanol..... | 97 | 66.03 | 6.47 | 12.84 | 66.10 | 5.51 | 12.85 |

PYRIDAZONES

| Formulae | °F. | Recrystallisation solvent | Yield, percent | Analysis, percent Calculated | | | Analysis, percent Found | | |
|---|---|---|---|---|---|---|---|---|---|
| | | | | C | H | N | C | H | N |
| 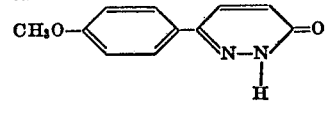 | 254 | Isopropanol....... | 93.5 | 66.34 | 6.03 | 12.89 | 64.06 | 5.98 | 12.85 |
| 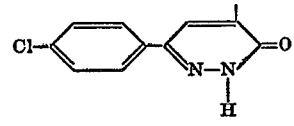 | 218 | Methanol.......... | 82 | 59.77 | 4.11 | 12.69 | 59.87 | 4.21 | 12.71 |
| 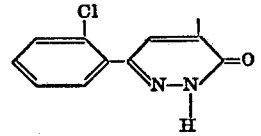 | 220 | Isopropanol....... | 86 | 59.87 | 4.11 | 12.69 | 59.73 | 4.22 | 12.51 |
| 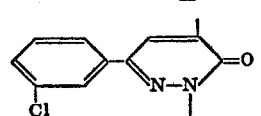 | 229 | Methanol.......... | 90 | 59.87 | 4.11 | 12.69 | 59.65 | 4.22 | 13.03 |
| 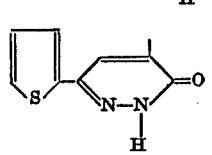 | 229 | Alcohol 95°....... | 80 | 56.22 | 4.19 | 14.57 | 55.99 | 4.15 | 14.38 |
| 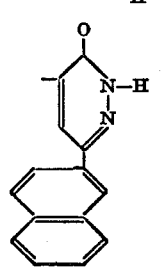 | 228 | Isopropanol....... | 82 | 76.24 | 5.12 | 11.85 | 75.56 | 4.89 | 11.90 |

TABLE—Continued

| Formulae | °F. | Recrystallisation solvent | Yield, percent | Calculated | | | Found | | |
|---|---|---|---|---|---|---|---|---|---|
| | | | | C | H | N | C | H | N |
| 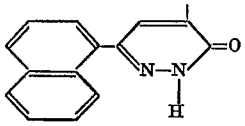 | 203 | ....do.......... | 65 | 76.24 | 5.12 | 11.85 | 75.92 | 5.03 | 11.93 |
| 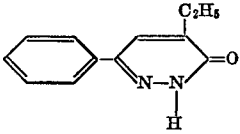 | 141 | ....do.......... | 95 | 71.98 | 6.04 | 13.99 | 71.41 | 6.09 | 14.11 |

EXAMPLE 1

Preparation of 3-amino-ethoxy-4-methyl 6-(paramethoxy) phenyl pyridazine

Operational method.—Weight 0.05 mole—1.15 g. of sodium into dry toluene. By heating and vigorous stirring, the sodium is separated into particles. Decant the toluene and add 25 ml. of dry tetrahydrofurane. Add slowly, with magnetic stirring 0.05 mole—3.06 g.—3.03 ml. of ethanolamine. In order to accelerate the reaction, heat the solution on a water-bath, whilst continuing to stir.

Then add to the alcoholate, 0.05 mole—11.75 g. of 3-chloro 4-methyl 6-(p-methoxy)-phenyl pyridazine in solution in 30 ml. of dry tetrahydrofurane. Sodium chloride separates after 7–8 hours of heating under reflux on the water-bath.

Filter NaCl and add a little anhydrous ether to the filtrate. Pass through gaseous HCl. There is obtained 13.6 g.—91% of hydrochloride, recrystallising in 95° alcohol. F=147°, resolidification, then F=218°. Extraction of the base: the base (Agr 601) may be isolated in the following manner: dissolve 0.005 mole (1.48 g.) of hydrochloride in 10 ml. of distilled water. Add 0.01 mole (1 g.) of potassium bicarbonate. The solution becomes limpid, yellow. After several moments, the base is separated in the form of a yellow oil, being deposited at the bottom of the container.

Extract with two portions of chloroform. Dry over anhydrous magnesium sulphate and evaporate the solvent. There remains a yellowish oil which after several moments crystallises.

Fine white power, insoluble in water, ether, soluble in chloroform.

Yield: 0.6 g.—40%.
F=104–108°; M=259.30.
Centesimal analysis, $C_{14}H_{17}O_2N_3$:
 Calc. (percent): C, 64.84; H, 6.60; N, 12.60.
 Found (percent): C, 64.39; H, 6.60; N, 14.50.

EXAMPLE 2

Preparation of N-methyl-piperazine 3-ethoxy-4-methyl 6-(paramethoxy) phenyl pyridazine Heat 0.113 mole—2.8 g. of sodium in dry toluene. When the solvent commences to boil, stir vigorously; the sodium is separated in particles. Decant the toluene and add 50 ml. of dry tetrahydrofurane. Add gradually 0.113 mole—16.3 g. of N-methylpiperazinoethanol, then heat on the water-bath until dissolving of the sodium.

Then add, in small fractions, 0.113 mole—26.5 g. of 3-chloro 4-methyl 6-(paramethoxy) phenyl pyridazine in solution in 50 ml. of tetrahydrofurane. The sodium chloride separates after heating for seven to eight hours on the water-bath with constant stirring. By the addition of distilled water, the sodium chloride dissolves, the base crystallises. Filter and dry.
Yield: 29 g.—76%.

Recrystallisation in isopropanol, $C_{19}H_{26}O_2N_4$; M=342; F=61°.

Formation of hydrochloride.—Dissolve 0.059 mole—22 g. of base in the minimum of hot isopropanol. Warm, then add drop by drop the equimolar quantity of concentrated hydrochloric acid. Start the crystallisation by the addition of anhydrous ether.
Yield: 20 g.—90%.
Recrystallisation in 95° alcohol.
White powder, soluble in water.
F=275–277°; M=378.5.
Centesimal analysis, $C_{19}H_{27}O_2N_4Cl$:
 Calc. (percent): C, 60.3; H, 7.13; N, 14.8.
 Found (percent): C, 61.0; H, 7.15; N, 14.4.

EXAMPLE 3

Preparation of morpholino 3-propoxy 4-methyl 6-(paramethoxy) phenyl pyridazine

Same method of operation as previously. Proportions: 1.4 g. (0.057 mole) of Na, 15.9 g. (0.057 mole) of morpholino-1-propanol and 13.25 g. (0.057 mole) of 3-chloro 4-methyl 6-(paramethoxy) phenyl pyridazine.

The base is extracted with ether. Drying on anhydrous $MgSO_4$. It is filtered and the ether is evaporated on a rotary evaporator. The base is recrystallised in isopropyl alcohol. Recrystallisation is very rapid with the use of a heated funnel.

Formation of hydrochloride.—Gaseous HCl is passed through the solution containing the base dissolved in acetone. We obtain 5 g. of hydrochloride which are recrystalised in 95° alcohol. F=113°.

EXAMPLE 4

Preparation of morpholino 3-(2-propoxy) 4-methyl 6-(paramethoxy) phenyl pyridazine Same method of operation as previously. Proportions: 2.8 g. (0.113 mole) of Na, 15.9 g. (0.113 mole) of 2-morpholinopropanol, 26.5 g. (0.113 mole) of 3-chloro 4-methyl 6-(paramethoxy) phenyl pyridazine.

After formation of the base and dissolving of the NaCl in water, the base is distilled under motor vacuum.

Yield.—10 g. of base are obtained, that is 27% with respect to the starting material, which distills under 3 mm. Hg between 255 and 265°.

Formation of hydrochloride.—Gaseous HCl is passed through the solution containing the base dissolved in acetone. 7.5 g. of hydrochloride are obtained, that is 70% with respect to the base. F=222°. Recrystallisation in isopropanol.

EXAMPLE 5

Preparation of 3-morpholinopropoxy 4-methyl 6-phenyl pyridazine

Weigh 0.21 mole (4.83 g.) of sodium into toluene. By heating and vigorous stirring the sodium is divided into small particles. Decant the toluene and add to the sodium 100 ml. of dry tetrahydrofurane. Add gradually 0.21 mole (30.5 g.) of morpholinopropanol. To accelerate the reaction, heat on the water-bath whilst stirring magnetically for about 7 hours.

Then add the alcoholate 0.21 mole (43 g.) of chloropyridazine in solution in 60 ml. of dry tetrahydrofurane. The sodium chloride separates after heating under reflux on the water-bath for 7 to 8 hours.

After this time, add a sufficient quantity of water to dissolve the sodium chloride and extract the base with 2 to 3 portions of ether. The ethereal extracts are dried over anhydrous magnesium sulphate and evaporated under vacuum with the pump. The oily residue crystallises by the addition of a previously obtained crystal. The yield is 92.7%.

EXAMPLE 6

Preparation of 3-(morpholinoethoxy) 4-methyl 6-naphthyl pyridazine (a) Formation of alcoholate: Weigh 2.5 g. (0.106 mole) of sodium into dry toluene. By heating and vigorous stirring the sodium is separated into small particles. Decant the toluene and add to the sodium 55 ml. of dry tetrahydrofurane. Then slowly add 15.4 g. (0.106 mole) morpholine ethanol. Heat on the oil bath at 110° whilst stirring magnetically.

After this time add to the cooled mixture 27 g. (0.106 mole) of 3-chloro 4-methyl 6-naphthyl pyridazine in solution in 30 ml. of dry tetrahydrofurane. Heat for 7 hours on the oil bath at 110° whilst stirring magnetically. Then add some water in a sufficient quantity to dissolve NaCl formed (approx. 500 ml.) and extract with three portions of ether (200—100—100 ml.). Wash the ethereal phase with water, dry it on anhydrous MgSO4 and evaporate the ether under pump vacuum. The oily residue obtained crystallises at the end of one night.

Yield: 33.5 g., or 91%.

(b) Formation of hydrochloride:

Agr 618: Obtained as Agr 614 from some 3-chloro 4-methyl 6-(1'-naphthyl) pyridazine.

Agr 619: Prepared as Agr 614 from 3-morpholine propanol and 3-chloro 4-methyl 6-(2'-naphthyl) pyridazine.

By way of example, there is given in the following Table III the measurement of the different manifestations of the action on the central nervous system of the compounds claimed in this division of the application. Therefore Table III reads as follows:

TABLE III.—ACTION UPON CENTRAL NERVOUS SYSTEM (MICE)

| Compound | AGR 614 | AGR 618 |
|---|---|---|
| Spontaneous motility, i.p | 25 | 50 |
| E.C. supra maximal, i.p | 100 | 0–100 |
| Anti-pentrazol, i.p | | |
| Traction, i.p | 100 | 0–100 |
| Equilibration, i.p | 25 | |
| Exploration, i.p | 12.5 | 100 |
| Catalepsy tementil, D.E | | 50 | set forth in the preceding table.

The stereotaxic study of the different central areas of the rabbit with Monnier and Gangloff apparatus, shows the response of the latter after the injection of molecules which have appeared to be the most active. For each one the exploration comprised a minimum of five animals. This is Table IV as follows:

TABLE IV.—STEREOTAXIC STUDY UPON RABBIT
[Stimulations-bipolar electrode]

| Compound tested | Agr 614 | Agr 618 |
|---|---|---|
| Dose thereof, mg./kg | 80 | 10–20 |
| E.E.G | (1) | (1) |
| Caudal core | | |
| Hippocampus | | |
| Reticulated formation | | 0 |
| Hypothalamus: | | |
| Anterior | | |
| Posterior | | |
| Sciatic: | | |
| 2 c./s | | |
| 60 c./s., hours | 24 | (2) |

[1] Slow waves.  [2] 30 minutes.

Finally, in Table VI below, there is given for several of the compounds considered the result of the test of the action on isolated ileum. This Table VI reads as follows:

TABLE VI.—ACTION UPON ISOLATED ILEUM (RABBIT, GUINEA PIG)

| Product | Tonus | Antagonism upon hypertony | | | | | Upon hypotony | | | |
| | | Nicotin Maxiton | Serotonin | Histamin | Bradydinin | Acetyl | AET | BaCl2 | KCl | Adrenalin |
|---|---|---|---|---|---|---|---|---|---|---|
| Agr 600 | | | | +++[1] | | | | | | |
| Agr 601 | | | | +++[2] | | | | | | |
| Agr 609 | — | | | | | | | | | |
| Agr 610 | | ± | +++ | +++ | +++ | | | | | |
| Agr 614 | — | | 0 | +++ | +++± | 0 | 0 | | | |
| Agr 616 | — | | | | +++± | 0 | ± | | | |
| Agr 620 | + then = | | ± +++ | 0 +++ | +++ | 0 | | | | 0 |
| Agr 646 | — | | | | +++ | | | | | |
| Agr 654 | — | +++ | +++ | ++ | +++ | +++ | +++ | +++ | +++ | 0 |

[1] 100% 3×100⁻⁵.  [2] 100% at 10⁻⁵.

It must be noted that in the test known as the "writhing test," the DE 50 of certain of the aforementioned products is in the order of 25 to 100 mg./kg. Therefore, for the product designated by the code number Agr 606, the DE 50 in mg./kg. per bone is 25.50. For the product Agr 607, it is 50 and for the product 609 it is 100.

In conclusion, the indications of the products according to the invention are as follows:

(a) analgesia in all medical indications, analgesia in surgical indications, analgesia and neuroplegia (neuroleptanalgesia) and anesthetic potentiation in anesthesia.
(b) anti-neurotic and anti-anxiety action (absence of indication in psychoses due to inverse hippocampic activity from that of the anti-psychotics, chloropromazine, reserpine, haloperidol, which favour after-discharges but synergic of tranquillisers).

ADMINISTRATION

| Route | Form | Dosage |
|---|---|---|
| By mouth | Compressed at 0.5 g | 0.5–2.0 g./day. |
| I.v | Ampules of 250 mg. in glucosed perfusion at 5–10%. | 1–8 ampules/24 hr. in slow perfusion. |
| I.m | Ampules of 250 mg | 2–4 g./24 hr. |

What I claim is:

1. A compound of the formula:

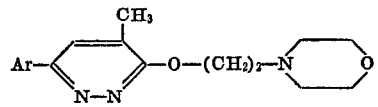

wherein Ar is alpha or beta naphthyl or non-toxic acid salts thereof.

2. A compound according to Claim 1 wherein Ar is beta naphthyl.

References Cited
UNITED STATES PATENTS

| | | | |
|---|---|---|---|
| 3,012,033 | 12/1961 | Engelbrecht et al. | 260—250 A |
| 2,905,672 | 9/1959 | Steck | 260—250 A |
| 2,858,311 | 10/1958 | Steck | 260—250 A |
| 2,835,626 | 5/1958 | Margot et al. | 260—250 A |
| 2,759,938 | 8/1956 | Breuil | 260—250 A |
| 2,624,730 | 1/1953 | Steck | 260—250 A |
| 2,484,029 | 10/1949 | Hartmann et al. | 260—250 A |

DONALD G. DAUS, Primary Examiner

J. TOVAR, Assistant Examiner

U.S. Cl. X.R.

260—247.2 R, 250 A, 268 H, 329, 520; 424—248, 250